United States Patent
Tatangelo et al.

(10) Patent No.: US 10,352,442 B2
(45) Date of Patent: Jul. 16, 2019

(54) METHOD AND APPARATUS TO CONTROL A CONTINUOUSLY VARIABLE TRANSMISSION

(71) Applicant: GM GLOBAL TECHNOLOGY OPERATIONS LLC, Detroit, MI (US)

(72) Inventors: Joseph W. Tatangelo, Wolverine Lake, MI (US); Zhen J. Zhang, West Bloomfield, MI (US); Paul G. Otanez, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 738 days.

(21) Appl. No.: 14/944,462

(22) Filed: Nov. 18, 2015

(65) Prior Publication Data
US 2017/0138472 A1 May 18, 2017

(51) Int. Cl.
*F16H 61/66* (2006.01)
*F16H 9/18* (2006.01)
*F16H 61/662* (2006.01)

(52) U.S. Cl.
CPC ............. *F16H 61/662* (2013.01); *F16H 9/18* (2013.01)

(58) Field of Classification Search
None
See application file for complete search history.

(56) References Cited

U.S. PATENT DOCUMENTS

| | | | | |
|---|---|---|---|---|
| 4,670,843 A | * | 6/1987 | Matsumura | B60W 30/18 474/12 |
| 6,381,529 B1 | * | 4/2002 | Mistry | F16D 31/02 180/307 |
| 2003/0149520 A1 | * | 8/2003 | Taniguchi | F16H 61/66259 701/59 |
| 2006/0229156 A1 | | 10/2006 | Suzuki et al. | |
| 2012/0090937 A1 | | 4/2012 | Samie et al. | |
| 2013/0130863 A1 | | 5/2013 | Xu et al. | |
| 2014/0074366 A1 | | 3/2014 | Cui et al. | |

FOREIGN PATENT DOCUMENTS

| | | |
|---|---|---|
| CN | 101627233 A | 1/2010 |
| CN | 101910685 A | 12/2010 |
| CN | 102401122 A | 4/2012 |
| CN | 104214332 A | 12/2014 |

* cited by examiner

*Primary Examiner* — Colby M Hansen
(74) *Attorney, Agent, or Firm* — Quinn IP Law

(57) ABSTRACT

A continuously variable transmission (CVT) including a hydraulically-controllable variator is described. A method for controlling the CVT includes detecting a transient event causing a commanded change in a speed ratio of the variator and disabling feedback control of hydraulic pressure to the variator during the transient event. A target pressure that achieves the commanded change in the speed ratio of the variator is determined, and a pressure trajectory is determined based upon the target pressure. A feed-forward control of the hydraulic pressure to the variator is executed in response to the pressure trajectory during the transient event.

12 Claims, 2 Drawing Sheets

METHOD AND APPARATUS TO CONTROL A CONTINUOUSLY VARIABLE TRANSMISSION

TECHNICAL FIELD

This disclosure relates to a continuously variable transmission for a vehicle powertrain, and a method and control routine associated therewith.

BACKGROUND

Powertrains having an internal combustion engine coupled to a continuously or infinitely variable transmission (CVT) may be employed to provide tractive effort in vehicles. A CVT is capable of operating at input/output speed ratios that are infinitely variable over a range between a minimum (underdrive) ratio and a maximum (overdrive) ratio, thus permitting selection of engine operation that achieves a preferred balance of fuel consumption and engine performance in response to an output torque request, which may originate from a vehicle driver. The capability of providing infinitely variable input/output speed ratios distinguishes a CVT from a step-gear transmission that employs a plurality of fixed gear and associated gear ratios that may be selectively engaged in response to an output torque request.

Known chain-type CVTs include two pulleys, each having two sheaves. A chain runs between the two pulleys, with the two sheaves of each of the pulleys sandwiching the chain therebetween. Frictional engagement between the sheaves of each pulley and the chain couples the chain to each of the pulleys to transfer torque from one pulley to the other. One of the pulleys may operate as a drive or input pulley, and the other pulley may operate as a driven or output pulley. The gear ratio is the ratio of the torque of the driven pulley to the torque of the drive pulley. The gear ratio may be changed by urging the two sheaves of one of the pulleys closer together and urging the two sheaves of the other pulley farther apart from each other, causing the chain to ride higher or lower on the respective pulley. The urging of the sheaves of the pulleys may be accomplished by applying controlled hydraulic pressure. Hydraulic pressure control routines may be underdamped, causing pressure overshoot events or overdamped, causing pressure undershoot events, both of which may result in system instability and reduced performance.

SUMMARY

A continuously variable transmission (CVT) including a hydraulically-controllable variator is described. A method for controlling the CVT includes detecting a transient event causing a commanded change in a speed ratio of the variator and disabling feedback control of hydraulic pressure to the variator during the transient event. A target pressure that achieves the commanded change in the speed ratio of the variator is determined, and a pressure trajectory is determined based upon the target pressure. A feed-forward control of the hydraulic pressure to the variator is executed in response to the pressure trajectory during the transient event.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
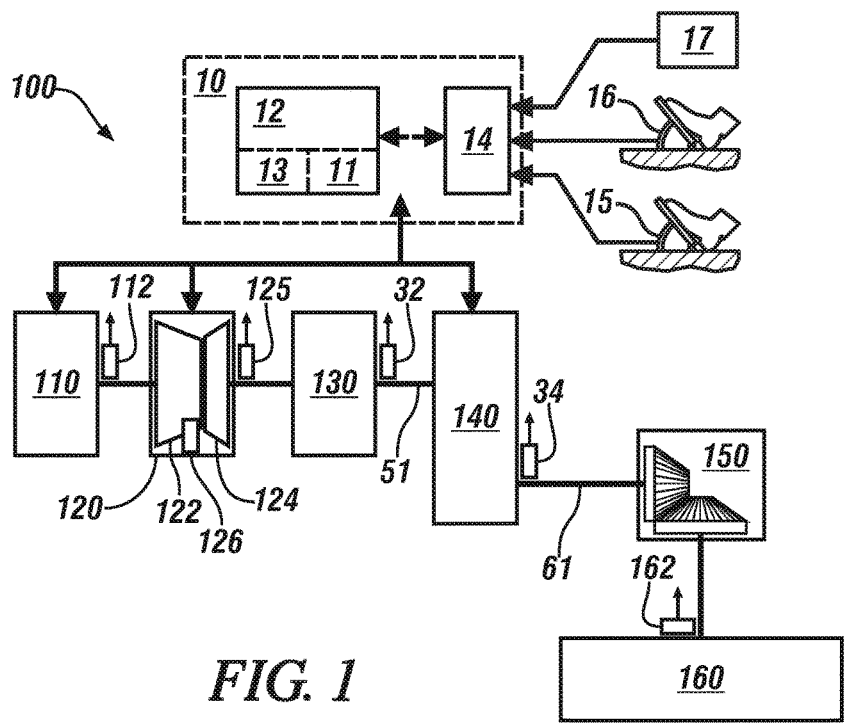
FIG. 1 schematically illustrates elements of a powertrain system that includes an internal combustion engine rotatably coupled to a continuously variable transmission (CVT) via a torque converter and a gear box, in accordance with the disclosure.

Referring now to the drawings, wherein the depictions are for the purpose of illustrating certain exemplary embodiments only and not for the purpose of limiting the same, FIG. 1 schematically illustrates elements of a powertrain system 100 that includes an internal combustion engine (engine) 110 rotatably coupled to a continuously variable transmission (CVT) 140 via a torque converter 120 and a gear box 130. The powertrain system 100 couples via a driveline 150 to a vehicle wheel 160 to provide tractive effort when employed on a vehicle. Operation of the powertrain system 100 is monitored by and controlled by a control system 10 in response to driver commands and other factors.

The engine 110 may be any suitable internal combustion engine capable of transforming hydrocarbon fuel to mechanical power to generate torque in response to commands originating from the control system 10. The torque converter 120 is a device providing fluidic coupling between its input and output members for transferring torque, and preferably includes a pump 122 that is coupled to the engine 110, a turbine 124 that is coupled via the output member to the gear box 130 and a torque converter clutch 126 that locks rotation of the pump 122 and turbine 124 and is controllable by the control system 10. The output member of the torque converter 120 rotatably couples to the gear box 130, which includes meshed gears or other suitable gearing mechanisms that provide reduction gearing between the torque converter 120 and the CVT 140. Alternatively the gear box 130 may be another suitable gear configuration for providing gearing between the engine 110, the torque converter 120 and the CVT 140, including, by way of non-limiting examples, a chain drive gear configuration or a planetary gear configuration. In alternative embodiments, either or both the torque converter 120 and the gear box 130 may be omitted.

The gear box 130 includes an output member that rotatably couples to the CVT 140 via an input member 51. One embodiment of the CVT 140 is described with reference to FIG. 2. An output member 61 of the CVT 140 rotatably couples to the driveline 150, which rotatably couples to the vehicle wheels 160 via an axle, half-shaft or another suitable torque transfer element. The driveline 150 may include a differential gearset, a chain drive gearset or another suitable gear arrangement for transferring torque to one or more vehicle wheels 160.

The powertrain system 100 preferably includes one or more sensing devices for monitoring rotational speeds of various devices, including, e.g., an engine speed sensor 112, a torque converter turbine speed sensor 125, a CVT variator input speed sensor 32, a CVT variator output speed sensor 34, and a wheel speed sensor 162, through which vehicle speed (Vss) is monitored. Each of the aforementioned speed sensors may be any suitable rotation position/speed sensing device, such as a Hall-effect sensor. Each of the aforementioned speed sensors communicates with the control system 10.

The control system 10 preferably includes a controller 12 and a user interface 14. The controller 12 may communicate with a plurality of controller devices, wherein each device is associated with monitoring and controlling a single system. This may include an engine control module (ECM) for controlling the engine 110, and a transmission controller (TCM) for controlling the CVT 140 and monitoring and controlling a single subsystem, e.g., the torque converter clutch 126. The controller 12 preferably includes a non-volatile memory device 11 containing executable instruction sets and a memory cache 13. The user interface 14 communicates with operator input devices including, e.g., an accelerator pedal 15, a brake pedal 16 and a transmission gear selector 17 to determine an output torque request. In certain embodiments, the transmission gear selector 17 includes a tap-up/tap-down feature, whereby a vehicle operator may manually select a transmission gear ratio and override automatic control of a speed ratio of the CVT 140. A tap-up command results in a command to the CVT 140 to decrease its gear ratio, which is accomplished by increasing a variator speed ratio. A tap-down command results in a command to the CVT 140 to increase its gear ratio by decreasing the variator speed ratio.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.), including the memory cache 13. The memory cache 13 is preferably configured as a non-volatile memory device having programmable read/write capabilities, which facilitates storage of data arrays for retrieval over off/on power cycles, as may occur in conjunction with vehicle key-off/key-on events. The non-transitory memory component(s) is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired link, a networked communication bus link, a wireless link or another suitable communication link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters, and regularly or periodically updating the states of the parameters during execution of a routine or between iterations of execution of the routine.

Figure 2:
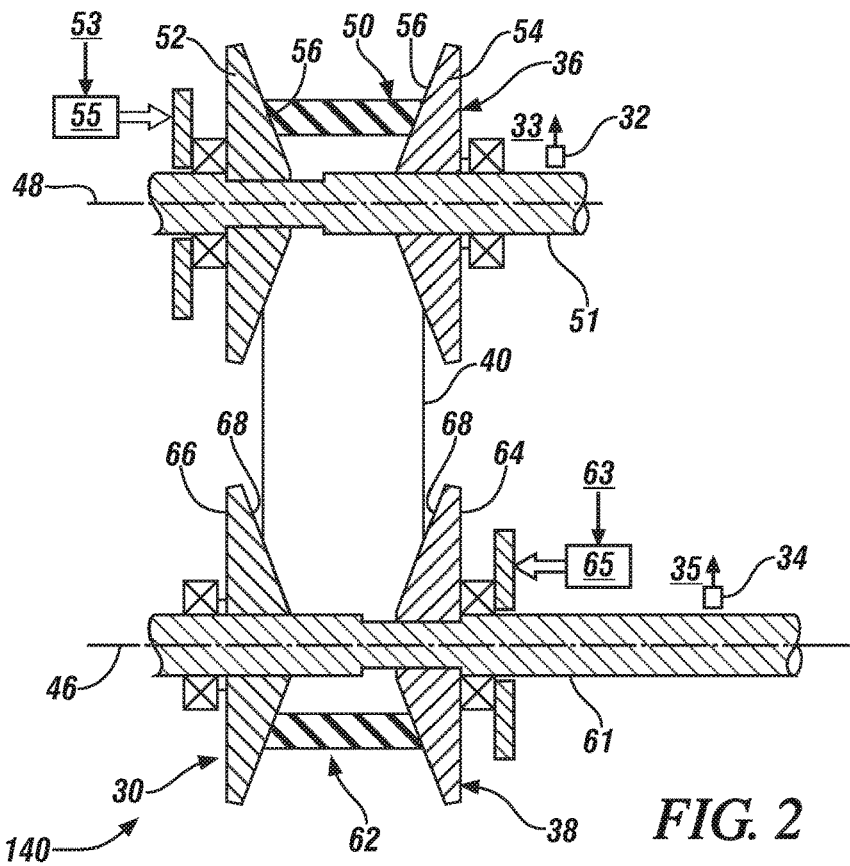
FIG. 2 is a schematic cross-sectional illustration of elements of a variator of a chain-type CVT, in accordance with the disclosure.

FIG. 2 schematically illustrates elements of a variator 30 of an embodiment of the CVT 140 that may be advantageously controlled by the TCM. The variator 30 transfers torque between the first rotating member 51 and the second rotating member 61. The first rotating member 51 is nominally referred to herein as input member 51, and the second rotating member 61 is nominally referred to herein as output member 61.

The variator 30 includes a first, or primary pulley 36, a second, or secondary pulley 38 and flexible continuous rotatable device 40 that rotatably couples the first and second pulleys 36, 38 to transfer torque therebetween. The first pulley 36 rotatably attaches to the input member 51 and the second pulley 38 rotatably attaches to the output member 61, and the rotatable device 40 is adapted to transfer torque between the first and second pulleys 36, 38 and thus between the input and output members 51, 61. The first pulley 36 and input member 51 rotate about a first axis 48, and the second pulley 38 and output member 61 rotate about a second axis 46. The continuous rotatable device 40 can be a belt, a chain, or another suitable flexible continuous device. The input speed sensor 32 may be mounted near the input member 51 to generate a CVT input speed 33 that relates to a speed of the first, input pulley 36, and the output speed sensor 34 may be mounted near the output member 61 to generate a CVT output speed 35 that relates to a speed of the second, output pulley 38. One of the first and second pulleys 36, 38 acts as a ratioing pulley to establish a speed ratio and the other of the first and second pulleys 36, 38 acts as a clamping pulley to generate sufficient clamping force to transfer torque therebetween. As used herein, the term 'speed ratio' refers to a variator speed ratio, which is a ratio of the speed of the output member 61 in relation to the speed of the input member 51. The speed of the input member 51 may be determined based upon a signal input from one of the engine speed sensor 112, the torque converter turbine speed sensor 125, or the input speed sensor 32, as described herein, or another suitable speed/position sensor. The speed of the output member 61 may be determined based upon a signal input from the output speed sensor 34 or the wheel speed sensor 162 as described herein, or another suitable speed/position sensor. Regardless of the measurement system(s)

employed, the speed ratio parameters are based upon the CVT input speed and the CVT output speed.

The first pulley 36 is split perpendicular to the first axis 48 to define an annular first groove 50 that is formed between a first moveable sheave 52 and a first stationary sheave 54. The first moveable sheave 52 axially moves or translates along the first axis 48 relative to the first stationary sheave 54. For example, the first moveable sheave 52 may be attached to the input member 51 via a splined connection, thereby allowing axial movement of the first moveable sheave 52 along the first axis 48. The first stationary sheave 54 is disposed opposite the first moveable sheave 52. The first stationary sheave 54 is axially fixed to the input member 51 along the first axis 48. As such, the first stationary sheave 54 does not move in the axial direction of the first axis 48. The first moveable sheave 52 and the first stationary sheave 54 each include a first groove surface 56. The first groove surfaces 56 of the first moveable sheave 52 and the first stationary sheave 54 are disposed opposite each other to define the annular first groove 50 therebetween. The opposed first grooved surfaces 56 preferably form an inverted frustoconical shape such that a movement of the first moveable sheave 52 towards the first stationary sheave 54 increases an outer pulley diameter of the annular first groove 50. A first actuator 55 is arranged with the first pulley 36 to control an axial position of the first moveable sheave 52 in response to a drive signal 53, including urging the first moveable sheave 52 towards the first stationary sheave 54. In certain embodiments, the first actuator 55 is a hydraulically-controlled device and the drive signal 53 is a hydraulic pressure signal. Hydraulic pressure may be monitored by a sensing device in the first actuator 55, or elsewhere in a hydraulic circuit supplying pressurized hydraulic fluid to the first actuator 55.

The second pulley 38 is split perpendicular to the second axis 46 to define an annular second groove 62 therebetween. The annular second groove 62 is disposed perpendicular to the second axis 46. The second pulley 38 includes a second moveable sheave 64 and a second stationary sheave 66. The second moveable sheave 64 axially moves or translates along the second axis 46 relative to the stationary sheave 66. For example, the second moveable sheave 64 may be attached to the output member 61 via a splined connection, thereby allowing axial movement of the second moveable sheave 64 along the second axis 46. The second stationary sheave 66 is disposed opposite the second moveable sheave 64. The second stationary sheave 66 is axially fixed to the output member 61 along the second axis 46. As such, the second stationary sheave 66 does not move in the axial direction of the second axis 46. The second moveable sheave 64 and the second stationary sheave 66 each include a second groove surface 68. The second groove surfaces 68 of the second moveable sheave 64 and the second stationary sheave 66 are disposed opposite each other to define the annular second groove 62 therebetween. The opposed second grooved surfaces 68 preferably form an inverted frustoconical shape such that a movement of the second moveable sheave 64 towards the second stationary sheave 66 increases an outer pulley diameter of the annular second groove 62. A second actuator 65 is arranged with the second pulley 38 to control an axial position of the second moveable sheave 64 in response to a driven signal 63, including urging the second moveable sheave 64 towards the second stationary sheave 66. In certain embodiments, the second actuator 65 is a hydraulically-controlled device and the driven signal 63 is a hydraulic pressure signal. Hydraulic pressure may be monitored by a sensing device in the second actuator 65, or elsewhere in a hydraulic circuit supplying pressurized hydraulic fluid to the second actuator 65. A ratio of the outer pulley diameter of the first pulley 36 and the outer pulley diameter of the second pulley 38 defines a transmission torque ratio. Other elements, such as clutch assemblies in the form of selectable one-way clutches and the like may be deployed between the variator 30 and other powertrain and driveline components and systems.

The speed ratio may be described in terms of an actual speed ratio and a desired speed ratio. An actual speed ratio indicates a present, measured value for the speed ratio, and may be determined based upon a ratio of the input speed signal 33 and the output speed signal 35. A desired speed ratio indicates a commanded, future value for the speed ratio, which may be determined based upon monitored and estimated operating conditions related to an output power command, vehicle speed, engine torque, and other factors. The TCM executes control routines to control the CVT 140 to achieve the desired speed ratio by controlling pressures of one or both the primary pulley 36 and the secondary pulley 38 of the CVT 140. Controlling pressures of one or both the primary pulley 36 and the secondary pulley 38 of the CVT 140 can be achieved by controlling the drive and driven signals 53, 63 to apply requisite pressures to the first and second actuators 55, 65 to effect the desired speed ratio, wherein the requisite pressures are preferably in the form of a primary pressure command and a secondary pressure command.

CVT operation includes hydraulic pressure control, which may require hydraulic pressure measurements and their relationship to pulley pressure. Accuracy of measured pulley pressure may vary, and may differ depending upon whether the CVT is executing a transient event or involved in steady state operation. A transient event is any event, preferably caused by a change in state of an operating parameter, which affects the equilibrium of the system and results in a change in state of an operating parameter. One transient event may include a change in a speed ratio of the variator that may occur in response to a change in an output torque request communicated or otherwise discerned through input from an accelerator pedal, a brake pedal, or a transmission range state.

There may be a hydraulic restriction between the location where the pulley pressure is measured and the location at which pressure is applied to the moveable sheave of the pulley, resulting in an applied pulley pressure lagging a measured pulley pressure. The pressure lag may be amplified during a transient event due to occurrence of high fluidic flow. The effect of the lag between measured and applied hydraulic pressure may be greatest during a fast ratio change, and associated changes in commanded pressure can result in pressure undershoot or pressure overshoot at one of the pulleys, thus affecting CVT performance and stability. These pressure inaccuracies act as disturbances to a closed loop pressure control routine and may result in unwanted variation in transmission output speeds. The behavior of the hydraulic system in the presence of large pressure changes is caused by the dynamic behavior of its hydro-mechanical components. Thus, during a transient event, closed loop pressure control routines employing proportional and/or integral terms may not be desired due to potential integrator accumulation associated with the hydraulic restriction and pressure lag.

Figure 3:
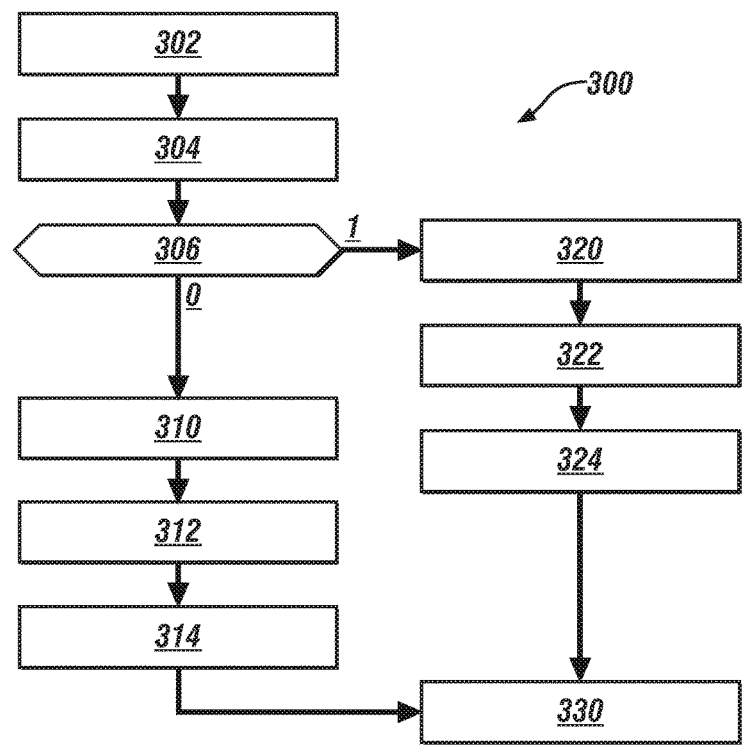
FIG. 3 schematically shows a block diagram of a CVT hydraulic pressure control routine 300 that may be employed to advantageously control hydraulic pressure to minimize or prevent pressure overshoot or undershoot in an embodiment of the variator of the CVT shown with reference to FIGS. 1 and 2, in accordance with the disclosure.

FIG. 3 schematically shows a block diagram of a CVT hydraulic pressure control routine (routine) 300 that may be employed to advantageously control hydraulic pressure to minimize or prevent pressure overshoot or undershoot to the elements of the variator 30 of the CVT 140. This preferably includes being responsive to effects of pressure control, since pressure control characteristics may vary between steady state and transient conditions. The routine 300 accounts for pressure control characteristics to achieve acceptable pressure control during both transient events and steady state operating conditions. This preferably includes disabling closed loop pressure control during transient events, preferably by tuning the proportional and integral feedback gain terms appropriately and may also include resetting an integrator term to zero. The feed-forward control of the hydraulic pressure to the variator 30 includes determining a pressure trajectory when an absolute difference between the target hydraulic pressure and the current hydraulic pressure is greater than a minimum pressure threshold.

The routine 300 is preferably executed by the controller 12, which communicates with and commands operation of the TCM to control hydraulic pressure in a clamping pulley of an embodiment of the variator 30 of the CVT 140 and powertrain system 100 described with reference to FIGS. 1 and 2 to improve responsiveness of the CVT 140 to changes in an output torque request. The routine 300 shown with reference to FIG. 3 is described with reference to Table 1, which is provided as a key wherein the numerically labeled blocks and the corresponding functions are set forth as follows.

TABLE 1

| BLOCK | BLOCK CONTENTS |
|---|---|
| 302 | Monitor output torque request |
| 304 | Determine target speed ratio for the CVT variator based upon the output torque request |
| 306 | Determine whether the target speed ratio requires transient control or steady-state control of hydraulic pressure to the variator |
| 310 | Execute feed-forward control of hydraulic pressure to variator; Set proportional gain term to disable proportional control of hydraulic pressure of variator |
| 312 | Set integral gain term to disable integral control of hydraulic pressure of variator |
| 314 | Enable feed-forward control of hydraulic pressure of variator |
| 320 | Execute feedback control of hydraulic pressure to variator; Set proportional gain term to enable proportional control of hydraulic pressure of variator |
| 322 | Set integral gain term to enable integral control of hydraulic pressure of variator |
| 324 | Disable feed-forward control of hydraulic pressure of variator |
| 330 | Control hydraulic pressure to variator that is responsive to feed-forward and feedback controls |

The routine 300 periodically executes to control hydraulic pressure supplied to one or both the primary pulley 36 and the secondary pulley 38 of the variator 30 to achieve a desired speed ratio. Controlling pressures of one or both the primary pulley 36 and the secondary pulley 38 may be achieved by controlling the drive and driven signals 53, 63 to apply requisite pressures to the first and second actuators 55, 65 to effect the desired speed ratio, wherein the requisite pressures are preferably in the form of a primary pressure command and a secondary pressure command.

The routine 300 includes monitoring an output torque request (302), and determining a target speed ratio for the CVT variator based upon the output torque request (304). The target speed ratio is compared with a presently commanded speed ratio to determine whether the hydraulic pressure is to be controlled using steady-state pressure control or transient pressure control.

Transient pressure control is commanded when a difference between the target speed ratio and the presently commanded speed ratio is greater than a minimum threshold, wherein the minimum threshold is associated with a change in hydraulic pressure to the variator 30 to achieve the target speed ratio (306)(0). Steady-state pressure control is commanded when a difference between the target speed ratio and the presently commanded speed ratio is less than the minimum threshold (306)(1). As such, when the change in hydraulic pressure to achieve the target speed ratio is less than the minimum threshold, steady-state pressure control is commanded. Likewise, when the change in hydraulic pressure to achieve the target speed ratio is greater than the minimum threshold, transient pressure control is commanded.

When the transient pressure control is commanded (306)(0), a proportional gain term employed in feedback proportional control of the hydraulic pressure of variator 30 is set at a value that disables the feedback proportional control (310), and an integral gain term employed in feedback integral control is set at a value that disables the feedback integral control (312). Alternatively, the proportional gain term employed in feedback proportional control of the hydraulic pressure of variator 30 is set at a value that limits the feedback proportional control to a transient-specific gain (310), and an integral gain term employed in feedback integral control is set at a value that limits the feedback integral control to a transient-specific gain (312). Feed-forward control of the hydraulic pressure supplied to the variator 30 is enabled, and preferably executed as described herein to eliminate or minimize occurrence of hydraulic pressure overshoot or undershoot during the transient event (314).

Figure 4:
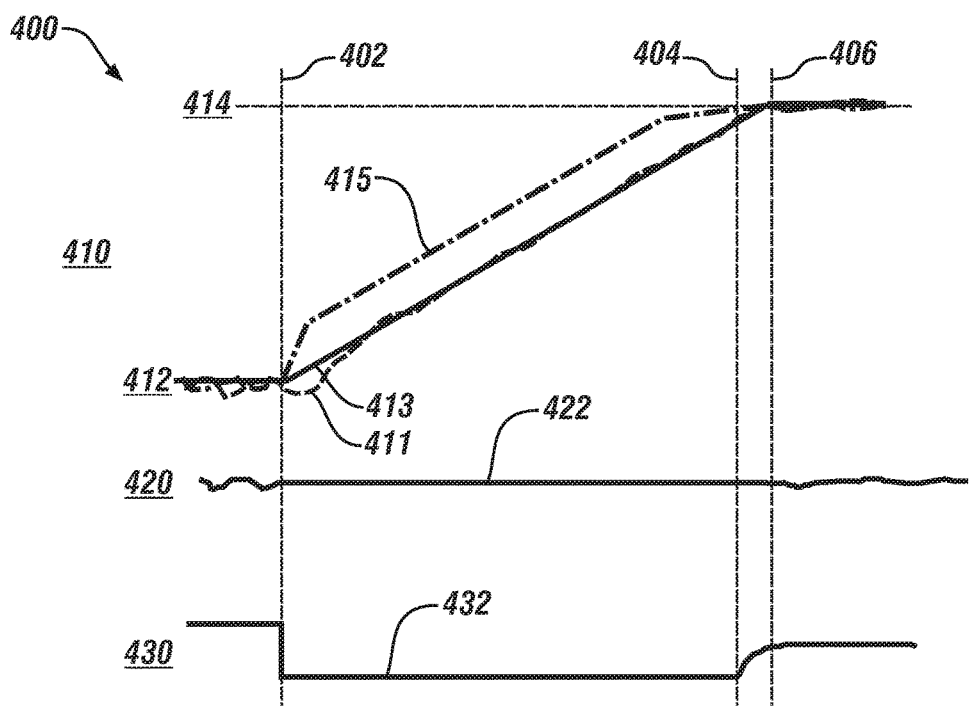
FIG. 4 graphically shows hydraulic pressure, a closed loop integrator state and a feedback controller state in relation to time during a transient event that includes a commanded increase in hydraulic pressure, in accordance with the disclosure.

The feed-forward control of the hydraulic pressure supplied to the variator 30 is described with reference to FIG. 4, which graphically shows states of parameters associated with operation of an embodiment of the powertrain system 100 including the CVT 140 and variator 30. The graph 400 is composed of states of parameters including coincident hydraulic pressure 410, closed loop integrator state 420 and feedback gain state PIDgx 430 in relation to time on the horizontal axis during a transient event that includes a commanded increase in hydraulic pressure. The data shown with reference to FIG. 4 is associated with operation of a portion of feed-forward control of the hydraulic pressure supplied to the variator during a transient event that includes a commanded increase in hydraulic pressure in response to a command to change the speed ratio of the variator 30 during operation. The hydraulic pressure 410 includes an initial pressure 412 and a target pressure 414, wherein the initial pressure 412 is associated with a presently commanded speed ratio and the target pressure 414 is associated with a target speed ratio. As shown, prior to timepoint t1 402, steady-state operation is employed in controlling the hydraulic pressure, with a measured pressure 411 tracking a desired pressure 413 in response to a pressure command 415. A closed loop integrator term 422 varies in response to the measured pressure 411, and a feedback gain state 432 is active.

A transient event begins at timepoint t1 402, at which point the closed loop integrator term 422 and the feedback gain state 432 are reset to zero. The feed-forward control of hydraulic pressure operates as follows based upon the initial pressure 412 and the target pressure 414, including determining the measured pressure 411 and the desired pressure 413 in response to a pressure command 415.

The feed-forward control of the hydraulic pressure supplied to the variator during a transient event preferably includes determining a trajectory between pressure commands whose difference, either signed or absolute value, is greater than a pressure threshold, $P_{threshold}$. The magnitude of the pressure threshold may be dependent on pump or input variator speed, transmission or input variator torque, variator or fluidic temperature, flowrate and other factors. The trajectory for the next pressure command, $P_{n+1}$, from the current pressure command, $P_n$, to pressure target, $P_{target}$, can be defined by the following relationships set forth in Equations 1 and 2, as follows.

$$P_{n+1} = P_n - (Cgain * P(P_n - P_{target})) \quad [1]$$

and when $$|P_{target} - P_n| < P_{threshold}, \text{ then } P_{n+1} = P_{target} \text{ or } P_{n+1} = P_{low} \quad [2]$$

wherein:
Cgain is a constant that controls how fast the trajectory converges to $P_{target}$,
$P_n$ is the starting pressure, and
$P_{low}$ is a constant pressure term.

The purpose of defining the trajectory as detailed with reference to Equations 1 and 2 is to initially have a relatively large pressure change for the initial response of the hydraulic system and have smaller differences between the trajectory points as the pressure target $P_{target}$ is approached. The relationship described with reference to Equation 1 is preferably employed to control the CVT 140 during the portion of its operation of FIG. 4 shown between timepoints t1 402 and t2 404, and the relationship described with reference to Equation 2 is preferably employed to control the CVT 140 during the portion of its operation of FIG. 4 shown between timepoints t2 404 and t3 406. This is done in order to decrease the pressure rate of change to achieve a soft landing at the pressure target that avoids or minimizes occurrence of pressure undershoot or overshoot. Alternatively, the desired pressure trajectory may be accomplished employing other methods such as splines, cubic functions, filters, etc.

As further shown in FIG. 4, the measured pressure 411 lags the commanded pressure 415 due to hydraulic restriction, transport delays, system communication latencies and other factors. The feed-forward control allows an increase in commanded pressure to counteract the hydraulic press lag of the actual pulley pressure. Overshoot is thus minimized at the end of the transient event, e.g., at timepoint t3 406, since the closed loop control is disabled. The feedback gain state 432 becomes active starting at timepoint t2 404, and the closed loop integrator term 422 becomes active starting at timepoint t3 406 in this example.

Referring again to FIG. 3, when the steady-state pressure control is commanded (306)(1), a proportional gain term employed in feedback proportional control of the hydraulic pressure of variator is set at a value that enables the feedback proportional control (320), and an integral gain term employed in feedback integral control is set at a value that enables the feedback integral control (322). Feed-forward control of the hydraulic pressure of the variator is disabled (324). The routine 300 controls hydraulic pressure to the variator 30 that is responsive to the feed-forward and/or the feedback controls as described (330).

Steady state conditions do not require high flow like transient conditions. Because steady state conditions do not require high flow, measured pressure more accurately reflects the pressure at the pulley. Improved measured pulley pressure accuracy minimizes the need for any form of feed-forward pressure control. Also, with improved measurement accuracy, the need to detune or disable the closed loop control gains becomes less critical for stable operation of the system.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instructions to implement the function or act specified in the flowchart.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling operation of a continuously variable transmission (CVT) including a hydraulically-controllable variator, the method comprising:
   detecting a transient event causing a commanded change in a speed ratio of the variator;
   disabling feedback control of hydraulic pressure to the variator during the transient event;
   determining a target pressure that achieves the commanded change in the speed ratio of the variator;
   determining a pressure trajectory based upon the target pressure; and
   executing feed-forward control of the hydraulic pressure to the variator responsive to the pressure trajectory during the transient event.

2. The method of claim 1, further comprising:
   detecting a steady-state event associated with operation of the variator;
   disabling executing the feed-forward control of hydraulic pressure to the variator; and
   executing only the feedback control of hydraulic pressure to the variator responsive to a commanded hydraulic pressure during the steady-state event.

3. The method of claim 1, wherein disabling feedback control of the hydraulic pressure to the variator during the transient pressure event comprises setting an integrator term and a proportional term of the feedback control to zero.

4. The method of claim 1, wherein detecting the transient event comprises detecting a transient pressure control event associated with the commanded change in the speed ratio of the variator.

5. The method of claim 1, further comprising determining the pressure trajectory based upon a difference between the target pressure and a current pressure command.

6. The method of claim 1, comprising executing the feed-forward control of the hydraulic pressure to the variator responsive to the pressure trajectory during the transient event to drive an actuator of a moveable sheave of a clamping pulley of the variator.

7. A method for controlling operation of a continuously variable transmission (CVT) including a hydraulically-controllable variator, the method comprising:
    executing only feed-forward control of hydraulic pressure to the variator in response to a pressure trajectory during a transient event; and
    executing only feedback control of hydraulic pressure to the variator in response to steady-state operation.

8. The method of claim 7, wherein executing only the feed-forward control of hydraulic pressure to the variator in response to a pressure trajectory during a transient event comprises:
    monitoring a commanded speed ratio of the variator;
    determining a commanded change in speed ratio of the variator;
    determining a target pressure that achieves the commanded change in the speed ratio of the variator based upon the commanded speed ratio of the variator; and
    determining the pressure trajectory associated with feed-forward control of hydraulic pressure to the variator based upon the target pressure.

9. The method of claim 7, wherein executing only the feedback control of hydraulic pressure to the variator in response to steady-state operation comprises:
    determining a commanded hydraulic pressure associated with the steady-state operation;
    disabling executing the feed-forward control of hydraulic pressure to the variator; and
    executing only the feedback control of hydraulic pressure to the variator responsive to the commanded hydraulic pressure during the steady-state event.

10. The method of claim 7, wherein executing only feed-forward control of hydraulic pressure to the variator in response to the pressure trajectory during the transient event comprises disabling feedback control of the hydraulic pressure to the variator including setting an integrator term of the feedback control to zero and setting a proportional term of the feedback control to zero.

11. The method of claim 7, further comprising determining the pressure trajectory based upon a difference between the target pressure and a current pressure command.

12. The method of claim 7, further comprising executing the only feed-forward control of the hydraulic pressure to the variator responsive to the pressure trajectory during the transient event to drive an actuator of a moveable sheave of a clamping pulley of the variator.

* * * * *